United States Patent [19]

McCracken

[11] Patent Number: 4,570,258
[45] Date of Patent: Feb. 11, 1986

[54] EXCHANGE SWITCH

[75] Inventor: Ronald A. McCracken, Pelham, N.H.

[73] Assignee: Wang Laboratories, Inc., Lowell, Mass.

[21] Appl. No.: 579,611

[22] Filed: Feb. 13, 1984

[51] Int. Cl.⁴ .......................................... H04Q 11/04
[52] U.S. Cl. ...................................... 370/58; 370/66; 370/62
[58] Field of Search ...................... 370/68, 66, 62, 58

[56] References Cited

U.S. PATENT DOCUMENTS

| 4,009,349 | 2/1977 | Belforte et al. | 370/66 |
| 4,093,827 | 6/1978 | Charransol et al. | 370/66 |
| 4,320,501 | 3/1982 | Le Dieu et al. | 370/68 |
| 4,471,479 | 9/1984 | Waas | 370/66 |
| 4,512,014 | 4/1985 | Binz et al. | 370/68 |

Primary Examiner—Douglas W. Olms
Attorney, Agent, or Firm—Michael H. Shanahan; Gary D. Clapp

[57] ABSTRACT

A non-blocking exchange switch for communicating information samples between points, including a time slot interchange, a voice conferencing system and a network interchange. The time slot interchange includes an interchange memory having a single storage location associated with each point connected from the switch. A point address memory provides point addresses corresponding to points and associated interchange storage locations. A connection memory provides corresponding connection addresses corresponding to interchange storage locations associated with points with which a point is communicating. The voice conferencing system includes a conference memory means providing conference addresses corresponding to points in a conference connection, and a sample memory means for storing individual samples from corresponding points. A conference processor means provides corresponding conference samples to conference communicating points, each conference sample comprising a summation of individual samples.

38 Claims, 4 Drawing Figures

EXCHANGE SWITCH

1. FIELD OF THE INVENTION

The present invention relates to a time slot interchange system for a computerized branch exchange system and, more particularly, to a single memory time slot interchange system for point to point and conferenced voice and data communication.

2. DESCRIPTION OF THE PRIOR ART

Communication of voice and data between time variable, selectable points, or terminals, is customarily accomplished by means of a 'branch exchange', that is, a centralized switching network connected to and providing reconfigurable transmission paths between the communicating points.

The earliest and most common example of such a branch exchange system is the common telephone system wherein a user or terminal connected to the telephone system may select another user or terminal, also connected to the system, to be communicated with. The originating user provides the identity of the selected other user to the system and the telephone branch exchange establishes a communications path between the users through the branch exchange switching system, often comprised of electromechanical switches and controllers.

The advent of cost effective computers has led to the use of computers to control branch exchange switching systems and to the use of computer type components, such as memories and multiplexers, and computer data handling techniques for the actual switching elements. Such systems often communicate voice information in digitized form, and may be used for data communication.

A recurring problem in branch exchange systems is that of providing, at reasonable cost and complexity, non-blocking communications. That is, to provide sufficient communication paths that a communication path may be established between any two or more given points at any time concurrently with all other possible communications which may occur. A non-blocking exchange essentially requires that there exist, in some form, a separate path for each possible pair of points connected to the system.

A second problem of exchanges of the prior art is that of providing conferencing of voice communications, that is, the mutual, non-interfering connection of several users together in a common circuit for concurrent communication between themselves.

Exchanges of the prior art have, in an attempt to achieve non-blocking, generally fallen into one of three general types, using space division multiplexing, time division multiplexing, or a combination of space and time division multiplexing to transfer information between points. In this context, space division multiplexing may be defined as the transfer of information from a first storage location writable by a source point to a second storage location readable by a receiving point. Time division multiplexing involves the transfer of information in time between time slots in a sequence of time slots, that is, from a fist time slot writable by a source point to a second time slot readable by a receiving point.

A first type of exchange, referred to as a space division switch, uses two complete memories with each memory containing a register, or memory location, for each point connected from the exchange. The memories are connected to each other through a bus and the inputs and outputs of the points are selectively connected to the memories through switches; a point's input is connected to one memory while the point's output is connected to the other memory. A particular memory is designated, with reference to a given point, as the 'up-stream' or 'down-stream' memory of that point where the designation is determined by the direction of data flow with respect to the point. That is, the 'up-stream' memory is connected from the point's output and the 'down-stream' memory to the point's input.

Information from a first point is written into it's 'up-stream' memory while information from a second point with which the first point is communicating is written into the second point's 'up-stream' memory. The information is then exchanged between the memories, that is, from each point's 'up-stream' memory to it's 'down-stream' memory. The first point then reads the information from the second point from the second point's 'down-stream' memory while the second point reads the information from the first point from the first point's 'down-stream' memory.

This first type of exchange is thereby both expensive and complex in that it requires two complete, interconnected memories and two switching systems to connect the points to the inputs and outputs of the memories. Further, conferencing is difficult to implement in such exchanges because of the complex voice data transfers required.

A second type of exchange, referred to as a time division switch, uses multiplexers to sample, in a first sequence, the information outputs of all points connected to the exchange. The multiplexers then rearrange the samples in time into a second sequence determined by the interconnections between points, and provides the samples to the appropiate receiving points.

Again, this type of exchange is both complex and expensive, due to the large number of multiplexers required, and is difficult to program due to the complex timing relationships. Conferencing is difficult to implement in such exchanges because of the complex voice data time sequence interchanges required.

The third general type of exchange uses both space and time division to establish paths between communicating points without blocking. The space division operation is provided by a single memory having a storage location for each point connected from the system. The time division operation is provided by time division multiplexers connected between the point outputs and the memory input and between the memory output and the point inputs.

During a first cycle, the memory input time division multiplexer scans the output of each point connected to the system in a fixed sequence and provides a time multiplexed output to the memory wherein the sequence of information samples from the points is determined by the interconnections between points. During this first cycle, the information samples from the input multiplexer output are written into corresponding assigned locations in the memory in the sequence received from the input multiplexer. During a second cycle, the memory locations are read in yet another sequence determined by the communications connections between points and the memory output sequence provided to the output time division multiplexer. During this second cycle, the sequence of samples received from the memory are again rearranged by the output multiplexer into a sequence determined by the connections and the outputs provided from the output multiplexer to the receiving points.

Although the third type of exchange uses only a single memory as compared to the first type, the input and output multiplexers are complex and expensive. In addition, the third type of exchange is complex to program, as is the second type, because of the complex timing interrelationships involved in the resequencing of samples required to obtain flexible and non-blocking connections. Again, voice conferencing is difficult to implement and involves all of the problems and complexities appearing in the first two types of exchanges described above.

Finally, there exists a fourth general type of exchange, described as 'essentially non-blocking', and which may be regarded as simplified and cost reduced versions of the above described types. In this type of system, the number of available communications paths is reduced and the interconnections simplified. As a result, blocking occurs in these systems and a tradeoff must be made between cost and an acceptable level of blocking. In addition, voice conferencing is difficult to implement on a satisfactory level due to the reduced system capacity for information transfer.

The present invention provides a means and method for implementing a time slot interchange for use in an exchange which provides non-blocking communication without the cost and complexity of the system described above. The present invention further provides a means and method for implementing voice conferencing in such a system while again avoiding the cost and complexity of the above systems.

SUMMARY OF THE INVENTION

The present invention relates to a non-blocking exchange switch for communicating information samples, that is, data or digitized voice samples between points connected from the switch. In a first aspect, the present invention includes a time slot interchange for communicating information between points and, in a second aspect, to a voice conferencing system for communicating voice among a plurality of points concurrently. In a third aspect, the exchange switch is expanded by the addition of a network interchange to provide a non-blocking exchange switch for use in a network of such switches.

The time slot interchange of the present invention includes an interchange memory having a single storage location for and associated with each point connected from the switch. A point address memory stores and provides point addresses, each point address corresponding to a point and an associated storage location. A connection memory responsive to each of the point addresses stores and provides corresponding connection addresses, each connection address corresponding to a storage location associated with a point with which the point corresponding to the point address is communicating. The interchange memory means is responsive to each point address for writing a sample from the corresponding point and into the associated storage location and to each connection address for reading a sample from the associated storage location and to the point associated with the corresponding point address.

The time slot interchange further includes a clock providing outputs defining successive sub-cycles, each sub-cycle having a write period and a read period. There is a point corresponding to each sub-cycle and the point address memory is responsive to operation of the clock means to provide a point address during each sub-cycle. The interchange memory means is responsive to the clock during the write period of each sub-cycle to write a sample from the point corresponding to the point address and into the associated storage location. The interchange memory means is further responsive to the clock during the read period of each sub-cycle to read a sample from the storage location corresponding to the connection address and to the point corresponding to the point address.

The voice conferencing system also includes the point address memory means, and a conference memory means responsive to each point address for providing conference addresses, each conference address corresponding to a point in a conference connection with the point corresponding to the point address. A sample memory means is responsive to each point address for storing individual samples from the corresponding points.

A conference processor means is connected from the sample memory means and is responsive to each point address and the corresponding conference addresses for providing corresponding conference samples to the points corresponding to the point addresses. Each conference sample comprises a summation of the individual samples from the points corresponding to the conference addresses.

The voice conferencing system operates in synchronization with the above described clocks with, in this case, the point address memory means being responsive to operation of the clock means to provide point addresses of points connected in a conference during corresponding sub-cycles. The sample memory means and conference processor means are responsive to operation of the clock means in each sub-cycle corresponding to a point address. During such a sub-cycle, the sample memory and conference processor may receive an individual sample from or to provide a conference sample to the corresponding point during the write period, and may perform operations to generate a conference sum for the corresponding point during the read period.

In a further embodiment, the exchange switch incorporates a central processor unit for controlling and directing operation of the switch. The central processor may, for example, provide point addresses to the point address memory means and connection and conference addresses to the connection and conference address memories. The central processor may further control the method, or procedure, by which the conference processor generates conference outputs.

In a yet further embodiment, the exchange switch is expanded by the addition of a network interchange to enable the interconnection of a plurality of exchange switches in a network providing non-blocking communication between points connected therefrom. In this embodiment, each exchange switch in the network further includes a network interchange, with each network interchange including one or more network memories wherein each network memory corresponds to one of the other exchange switches in the network. Each such network memory further includes a single storage location for and associated with each point connected from the corresponding other exchange switch in the network and is similar in structure and operation to the interchange memory or a time slot interchange.

As information from the points connected from a particular exchange switch is written into that switch's interchange memory, the information is concurrently transmitted to and written into the corresponding storage locations in the corresponding network memories of the network interchanges of the other switches in the network. Each switch will thereby contain, in it's local network memories, copies of the information currently stored in the interchange memories of all other switches.

A point connected from a local exchange switch and communicating with a remote point connected from a remote switch will thereby read information transmitted by the remote point from the remote point's corresponding storage location in the local switch's network memory corresponding to the remote switch. Similarly, the remote point will read information transmitted by the local point from the storage location in the remote switch's own network interchange memories corresponding to the local switch.

Storage locations in the network interchange memories of an exchange switch are read and written under direction of node addresses provided from the exchange switch's connection memory, the connection memory being expanded to include node address information. The node addresses stored in a particular local connection memory identify, for each point connected from each remote switch in the network, the particular local network memory corresponding to that remote switch and the storage location in the local network memory corresponding to that remote point.

It is thereby advantageous to incorporate the present invention into an exchange switch as the present invention provides a non-blocking switch with increased flexibility and reduced complexity and cost and further provides conferencing capability.

It is thus an object of the present invention to provide an improved exchange switch.

It is a further object of the present invention to provide a single memory time slot interchange.

It is yet another object of the present invention to provide an improved conferencing system.

It is still another object of the present invention to provide an improved exchange switch with a single memory time slot interchange and an improved voice conferencing system.

Other objects and advantages of the present invention will be understood by those of ordinary skill in the art after the following description of a preferred embodiment and and examination of the drawings wherein:

DESCRIPTION OF A PREFERRED EMBODIMENT

The following will first individually describe the structure and operation of a time slot interchange and of a voice conferencing system on a diagrammic level. A system incorporating both the time slot interchange and voice conferencing system will then be described on a more detailed block diagram level. Finally, a network incorporating expanded, non-blocking time slot interchange switches will be described, followed by brief descriptions of further or expanded embodiments of the present invention.

A. Time Slot Interchange (FIG. 1)

Figure 1:
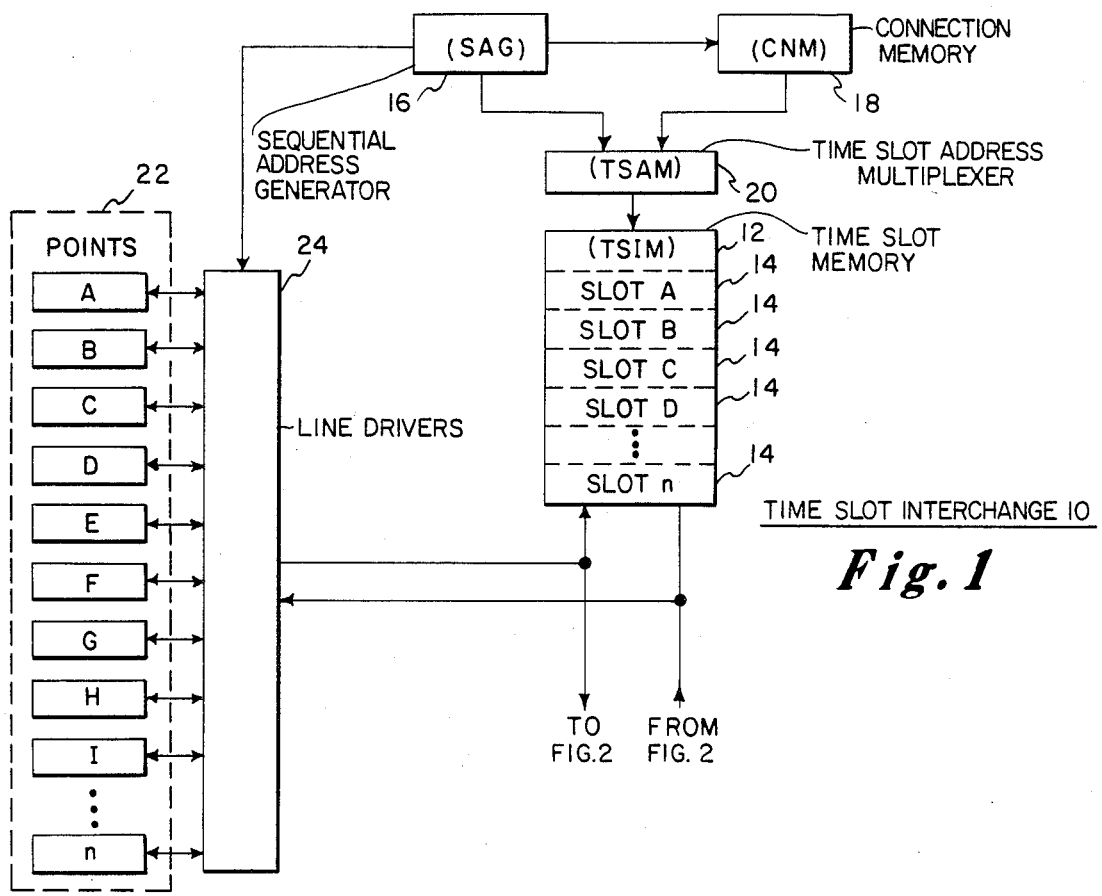
FIG. 1 is a diagrammic illustration of a time slot interchange for voice and data communication.

Referring to FIG. 1, a diagrammic illustration of a time slot interchange usable for voice and data communication, for example, in a computerized or programmed branch exchange (CBX/PBX), is shown.

Time Slot Interchange (TSI) 10 is shown therein as including Time Slot Memory (TSM) 12 for storing samples of information, that is, data or digitized voice samples, to be communicated between one point and another. TSIM 12 includes a storage location, or Slot 14, for each point or terminal connected to TSI 10.

Sequential Address Generator (SAG) 16 generates a sequence of addresses identifying and selecting corresponding points to transmit and receive information samples and the corresponding Slots 14 in TSIM 12 into which the transmitted samples are to be written. The sequence of addresses provided by SAG 16 thereby determines the sequence in which the points are serviced, and thus the operating cycle of TSI 10.

Connection Memory (CNM) 18 contains, for each point, addresses corresponding to and identifying the point or points, and their corresponding Slots 14, with which that point is communicating. CNM 18 provides these connection addresses as read addresses for reading information samples from Slots 14 to the receiving points. The selection of connection addresses is determined by address inputs provided to CNM 18 from SAG 16.

The address outputs of SAG 16 and CNM 18 are connected, as indicated, to inputs of Time Slot Address Multiplexer (TSAM) 20. TSAM 20 selects write or read addresses from SAG 16 or CNM 18 to be provided to the address input of TSIM 12.

Points or terminals 22, which may, for example, include telephone handsets, "data phones", personal computers, computers and data processing systems and other communications systems, are shown as connected to the data inputs and outputs of TSI 10, that is, of TSIM 12, through Line Drivers (LDs) 24. LDs 24 receive information samples to be transmitted from Points 22 and provide the information samples to the data input of TSI 10. In return, LDs 24 receive transmitted information samples from the data output of TSI 10 and provide the information samples to Points 22. As indicated in FIG. 1, an address output of SAG 16 is provided to LDs 24 to select corresponding Points 22.

The operating cycle of TSI 10, during which an information sample is received from and provided to each of the Points 22 currently communicating through TSI 10, is comprised of a sequence of split sub-cycles. There is one sub-cycle associated with each of the Points 22 and the sequence of sub-cycles, and corresponding Points 22, are determined and selected by the sequential write addresses provided by SAG 16. Each sub-cycle is split into two periods and, during each such sub-cycle, the associated Point 22 transmits an information sample during one period of the sub-cycle and receives an information sample during the other period of the sub-cycle.

During the first, or transmit, period of a sub-cycle associated with a particular Point 22, that Point 22 and its' associated Slot 14 in TSIM 12 are identified and selected by the corresponding one of the sequential write addresses provided by SAG 16. An information sample to be transmitted by that Point 22 is transferred from that Point 22's LD 24 and is written into that Point 22's associated Slot 14 in TSIM 12.

During the second, or receive, period of that Point 22's sub-cycle, a second Point 22 with which the first Point 22 is presently communicating, and its' associated Slot 14, are identified and selected by a read address provided from CNM 18. An information sample previously transmitted by the second Point 22 is read from the second Point 22's Slot 14 and to the LD 24 of the first Point 22 to be provided to the first Point 22.

The second Point 22 with which the first Point 22 is communicating will, in turn as it is identified by the address output of SAG 16, write a sample into it's corresponding Slot 14 during the transmit period of its' sub-cycle. The second Point 22 will then, during the receive period of its' sub-cycle and under control of its' corresponding read address from of CNM 18, read the sample previously written into the first Point 22's Slot 14.

After each communicating point has transmitted and received an information sample during its' associated subcycle, as described above, TSI 10's operating cycle is repeated so that there is a continuous flow of information samples between the communicating Points 22.

To illustrate further, assume that six Points 22, respectively designated as Points A, B, C, D, E and F, are currently communicating and that the communicating pairs of Points 22 are A and F, B and D, and C and E. The Point 22 sub-cycles may occur, for example, in the order A, B, C, D, E and F as determined by the sequence of corresponding addresses provided by SAG 16.

When the sequence of addresses provided by SAG 16 reaches the sub-cycle corresponding to Point 22-A, an information sample will, during the transmit period of Point 22-A's sub-cycle, be written from Point 22-A's LD 24 into the Slot 14 identified by the SAG 16 address as corresponding to Point 22-A. During the receive period of Point 22-A's sub-cycle, an information sample written into Point 22-F's Slot 14 during the previous TSI 10 operating cycle will be read from Point 22-F's Slot 14, as identified by the read address provided by CNM 18 for Point 22-A, to Point 22-A's LD 24.

During the sub-cycle corresponding to Point 22-B, an information sample will be written from Point 22-B to Point 22-B's Slot 14 and an information sample previously transmitted by Point 22-D during the previous TSI 10 cycle will be read from Point 22-D's Slot 14 to Point 22-B.

During the sub-cycle corresponding to Point 22-C, an information sample will be written from Point 22-C to Point 22-C's Slot 14 and an information sample previously transmitted by Point 22-E during the previous TSI 10 cycle will be read from Point 22-E's Slot 14 to Point 22-C.

During the sub-cycle corresponding to Point 22-D, an information sample will be written from Point 22-D to Point 22-D's Slot 14 and the information sample previously transmitted by Point 22-B during the present TSI 10 cycle will be read from Point 22-B's Slot 14 to Point 22-D.

During the sub-cycle corresponding to Point 22-E, an information sample will be written from Point 22-E to Point 22-E's Slot 14 and the information sample previously transmitted by Point 22-C during the present TSI 10 cycle will be read from Point 22-C's Slot 14 to Point 22-E.

During the sub-cycle corresponding to Point 22-F, an information sample will be written from Point 22-F to Point 22-F's Slot 14 and the information sample previously transmitted by Point 22-A during the present TSI 10 cycle will be read from point 22-A's Slot 14 to Point 22-F.

After all Points 22 have been serviced by the transmitting and receiving of an information sample, as described above, the TSI 10 operating cycle will repeat.

In a present embodiment of TSI 10, TSIM 12 may include, for example, 1024 Slots 14, thereby allowing TSI 10 to service 1024 Points 22 with non-blocking voice and data communications. Assuming that each Point 22 is sample at an 8 Khz rate, which is well within the sampling frequency for voice communications, a Point 22 sub-cycle will thereby be 122 nanoseconds and each transmit and receive sub-cycle will be 61 nanoseconds. The number of Slots 14 may be increased to acommodate further Points 22 with a corresponding increase in sampling rate, or by retaining the 8 Khz samples rate with some reduction in voice quality.

Each Slot 14 and the input and output busses of TSIM 12 may, for example for voice communications, be 8 bits wide. A part or all of TSI 10 may be provided, as described above, with the capability of data communications. In this case, TSIM 12 or the portions thereof to be provided with data communications capability and TSIM 12's input and output busses may be increased in width to that required for the data to be transmitted, for example, 12, 16, 24 or 32 bits.

TSI 10 may be further utilized for a form of 'broadcast' transmission, that is, wherein voice or data from one Point 22 is concurrently transmitted to two or more other Points 22. In this case, the receiving Points 22 will, rather than reading information from different Slots 14 corresponding to different transmitting Points 22, read information from the single Slot 14 corresponding to the transmitting, or 'broadcasting', Point 22. This form of 'broadcast' transmission differs, however, from the conferencing of multiples Points 22, which will be described below.

Finally, voice data transmitted through TSI 10 has been described above as digitized, that is, as having been sampled and converted to a sequence of digital data samples which may be reconstructed after reception to provide an analog voice output signal to a user. In the presently preferred embodiment, voice is digitized according to the generally accepted u-Law procedure, although other sampling methods may be used in other embodiments.

Having described the structure and operation of a TSI 10 above, the structure and operation of a voice conferencing system usable with TSI 10 will be described next below.

Figure 2:
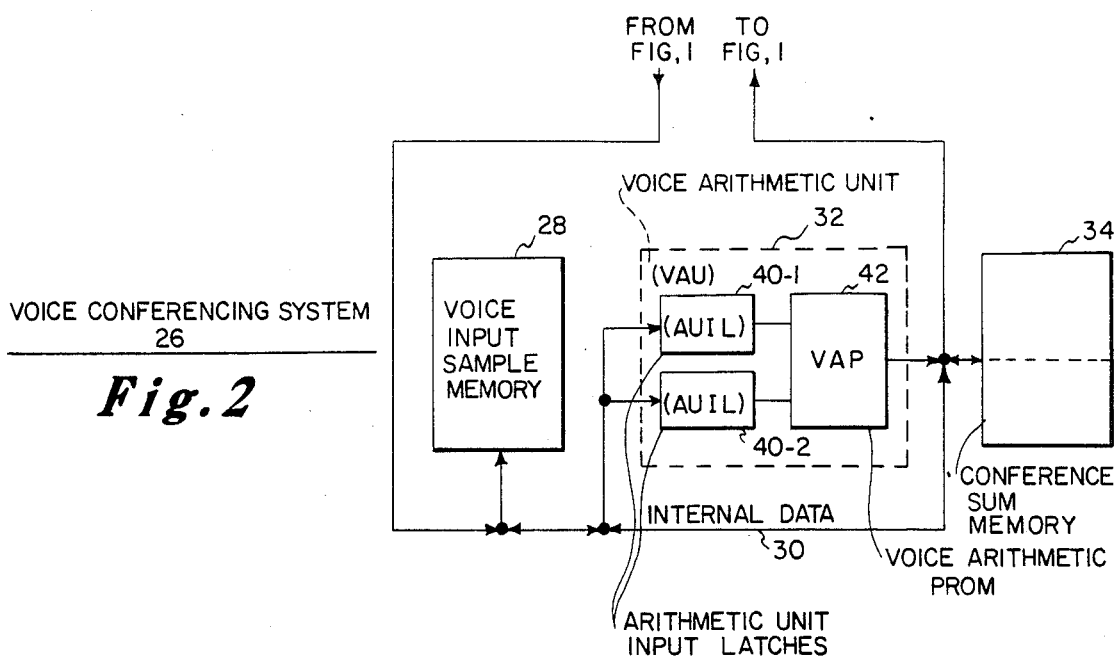
FIG. 2 is a diagrammic illustration of a voice conferencing system in association with a time slot interchange.

B. Voice Conferencing System (FIG. 2)

Voice conferencing differs from the point to point or 'broadcast' communications described above in that in conferencing three or more Points 22 are concurrently communicating voice information to each other. It should be further noted that, for good quality voice conferencing, any given point should preferably receive only transmissions from the other points in conference, that is, a point should not 'hear' its' own transmission.

The voice conferencing system thereby receives digitized voice transmissions from each Point 22 in a conference connection and forms and transmits to each receiving Point 22 in the conference a conference transmission comprised of the summed transmissions of all other Points 22 in the conference.

To illustrate, assume a conference connection comprised of three Points 22, respectively designated as points A, B and C. Points A, B and C will each transmit concurrently with A transmitting to B and C, B to A and C, and C to A and B. A will thereby receive conference samples wherein each conference sample is comprised of a sum of individual samples transmitted by B and C. B will receive conference samples comprised of a sum of individual samples transmitted by A and C, and C will receive conference samples comprised of a sum of individual samples transmitted by A and B.

Referring to FIG. 2, a diagrammic illustration of a Voice Conferencing System (VCS) 26 usable with the above described TSI 10 is shown. The interconnection between VCS 26 and TSI 10 is indicated by the dotted connections between VCS 26 and TSI 10 in FIGS. 2 and 1, respectively. As indicated therein, VCS 26 includes a Voice Input Sample Memory (VISM) 28 having a bidirectional input/output connected from VCS 26's bidirectional Internal Data (ID) Bus 30 which, in turn and as described further below, is connected from TSI 10's data input bus. ID Bus 30 is further connected to the inputs and outputs of Voice Arithmetic Unit (VAU) 32, to the bidirectional input/output of Conference Sum Memory (CSM) 34, and to the input of Voice Conference Output Latch (VCOL) 36. The output of VCOL 36 is in turn connected, again as described further below, to the TSI 10 output data bus.

Referring briefly to VAU 32, VAU 32 is shown as including Arithmetic Unit Input Latches (AUILs) 40-1 and 40-2 having inputs, as described above, connected from ID Bus 30 and outputs connected to Voice Arithmetic PROM (VAP) 42. VAP 42 in turn has an output connected, as described above, to ID 30.

The operations of VCS 26, described below, are determined and controlled by conference connection address information stored in Conference Address Memory (CFM) 38, which has addresss outputs to VISM 28 and CSM 34. VCS 26 is capable of supporting multiple, concurrent conferences.

As described previously, the operations performed by VCS 26 include the receiving of individual voice samples from the Points 22 in a conference connection, the combination or summation of the individual samples into conference samples, and the transmission of conference samples to the Points 22. The individual samples are received from each of the Points 22 in a conference connection through ID Bus 30's connection from TSM 12's input data bus and are stored in VISM 28 for subsequent use by VAU 32 in generating conference samples. In this respect it should be noted that VAU 32 is capable of summing two samples values at a time; as such it is necessary to generate and store intermediate conference sample sums, as described further below, for any conference of more than three Points 22. For this reason, CSM 34 is logically organized into two areas, the first being used to store intermediate sample sums and the second being used to store the final, completed conference sample sums. In the second area, that used to store final conference sample sums, the final sums are stored in slots having addresses corresponding to the Points 22 receiving the sums. That is, each Point 22 in a conference connection has a corresponding assigned slot in the lower, final sum area of CSM 34. VAU 32 and CSM 34 thereby together comprise a process for generating voice conference outputs to each of the Points 22 in a conference connection.

To illustrate the operation of VCS 26, assume that a particular Point 22 designated as 22-Z is connected in conference with Points 22-A, 22-B and 22-C. Points 22-Z will therefore receive conference samples comprised of sums of individual samples received from Points 22-A, 22-B and 22-C.

Assuming that samples A, B and C are received from, respectively, Points 22-A, 22-B and 22-C in that order, individual samples A and B are read into and stored in VISM 28 as received. Samples A and B are subsequently read through ID Bus 30 to the inputs of AUIL 40-1 and 40-2 and used by VAP 42 to generate an intermediate sample sum (A+B). Intermediate sum (A+B) is then transferred through ID Bus 30 to CSM 34 and stored in the intermediate sum area of CSM 34. During this time, individual sample C is received from Point 22-C and, as were samples A and B, is stored in VISM 28.

The intermediate sum (A+B) is then read from CSM 34 and through ID Bus 30 to an AUIL 40 and the individual sample C is read from VISM 28 and through ID Bus 30 to the other AUIL 40. VAP 42 then uses these data inputs to generate the final conference sample sum (A+B)+C, or (A+B+C). The conference sample (A+B+C) for Point 22-Z is then transferred through ID Bus 30 and written into the final conference sample area of CSM 34. Subsequently, when Point 22-Z is to receive a conference sample from VCS 26, the conference sample (A+B+C) is read from CSM 34 and through ID Bus 30 to VCOL 36, (A+B+C) then being read from VCOL 36 to the LD 24 of Point 22-Z through VCOL 36's connection to TSIM 12's data output bus.

It should be noted with regard to the arithmetic operations of VAU 32 that TSI 10, and thus VCS 26, were previously described as operating with u-Law converted voice information samples. The addition of samples and intermediate sums to generate intermediate and final sums, however, is performed linearly. VAP 42 thereby performs, for each addition operation, a u-Law to linear conversion of the data inputs, linear addition addition of the converted data inputs, and a linear to u-Law conversion of the resulting sum. As previously described, VAP 42 is presently implemented in a ROM and thereby performs these operatons through look-up tables contained therein.

As in TSI 10, the receiving, arithmetic and transmission operations of VCS 26 are executed on the basis of split sub-cycles and are performed in parallel and synchronization with the operations of TSI 10. The first period of each sub-cycle is used by VCS 26 for information transfer, that is, to receive information samples from Points 22 and to transfer final conference samples to Points 22. The second period of each sub-cycle is used for arithmetic operations, that is, the transfer of individual samples and intermediate and final sums between VISM 28, CSM 34 and VAU 32 and the generation by VAU 32 of intermediate sums and final conference sample sums.

It is apparent from the above description that the generation of a conference sample output to a single Point 22 requires multiple arithmetic operations, each requiring one cycle, and that the number of operations increases with the number of Points 22 in a conference connection. As such, it is preferably to minimize the number of arithmetic operations required to generate a given conference sample. By doing so, both the number of Points 22 which may be involved in a given conference connection and the number of conference connections which may be concurrently supported may be maximized.

The following presents the method, that is, the sequence of operational steps, presently implemented in VSC 26 for generating conference samples. Essentially, the Points 22 connected in conference are logically organized as pairs. For each such pair, referred to herein as a recipient pair, the individual sample inputs of other pairs are summed to generate first intermediate sums. The first intermediate sums are summed, with other intermediate sums or with other individual samples, to generate further intermediate sums, and so on as necessary until a final intermediate sum for that pair is reached. This final intermediate sum will be comprised of the summation of the individual input samples from each Point 22 in each of the other pairs. Then, for each Point 22 of the recipient pair, the individual sample input from the output Point 22 of the recipient pair is summed with the final intermediate sum to generate the conference sample for the Point 22.

This operation is then repeated for the next recipient pair, and so on until a conference sample has been generated for each Point 22 in the conference connection.

It should be noted that a conference connection containing an odd number of Points 22 will result in one pair of Points 22 containing a single member. In this case, that member is treated as a pair except that the summation operation to generate the first intermediate sum is not required, the single sample in that single member pair being, essentially, the first sum. It should be further noted, in the following examples, that the summation operations are grouped to reduce the number of information transfers from CSM 34 or VSIM 28 to VAU 32, thereby further reducing the number of arithmetic operations. Essentially, operations repeatedly using a particular individual sample or intermediate sum are grouped so that the particular sample or sum need be loaded into the AUIL 40's only once for the group of operations.

Having described the general method of operation of VCS 26 for generating conference samples, examples are presented next below for conference connections of 3, 4, 5 and 6 Points 22. Each example is presented in the form of four columns. The first and second columns on the left, designated by First AUIL and Second AUIL, present for each operational step the values, that is, individual samples or intermediate sums, residing in the AUIL 40s during that step. It should be noted that an intermediate sum is represented as an entity by being enclosed in parenthesis; the value of the intermediate sum, that is, the sum of the individual samples comprising the intermediate sum, is presented within the parenthesis. For example, the intermediate sum resulting for the summation of the individual samples from Points 22 A, B and C is represented as (A+B+C).

A value which is written into an AUIL 40 at the beginning of a particular step is indicated by being underlined. It should be remembered that individual samples are written into the AUIL 40s from VISM 28 while intermediate sums are entered from CSM 34, or the output of VAU 42, and that the first-area of CSM 34 is used to store intermediate values for subsequent use.

The third column, designated by VAP 42 Result, presents for each step the sum value output from VAP 42 resulting from the two values presently residing in the AUIL 40s, that is, the resulting intermediate or final sum. Again, intermediate sums are represented by a summation value enclosed in parenthesis, as are final conference sample sums.

The fourth column is headed by the designation Conference/Intermediate. For clarity of presentation, intermediate sums, that is, sums used to form other sums, are indicated upon first appearance at the output of VAP 42 by the appearance in the fourth column of a designation of the form I1, I2, I3, and so on. The appearance at the output of VAP 32 of a final conference sample sum for a given Point 22 as the result of a present operational step will be represented by the appearance in the fourth column of a letter corresponding to the Point 22 for which that result is the conference sample.

EXAMPLES OF VCS 26 ARITHMETIC OPERATIONS

| First AUIL 40 | Second AUIL 40 | VAP 42 Result | Conference/Intermediate |
| --- | --- | --- | --- |
| 1. 3 Points 22: A, B and C | | | |
| <u>A</u> | <u>B</u> | (A + B) | C |
| A | <u>C</u> | (A + C) | B |
| <u>B</u> | C | (B + C) | A |
| 2. 4 Points 22: A, B, C and D | | | |
| <u>A</u> | <u>B</u> | (A + B) | I1 |
| <u>(A + B)</u> | <u>C</u> | (A + B + C) | D |
| (A + B) | <u>D</u> | (A + B + D) | C |
| <u>C</u> | D | (C + D) | I2 |
| <u>(C + D)</u> | <u>A</u> | (A + C + D) | B |
| (C + D) | <u>B</u> | (B + C + D) | A |
| 3. 5 Points 22: A, B, C, D and E | | | |

-continued

| First AUIL 40 | Second AUIL 40 | VAP 42 Result | Conference/Intermediate |
|---|---|---|---|
| A | B | (A + B) | I1 |
| (A + B) | C | (A + B + C) | I2 |
| (A + B + C) | D | (A + B + C + D) | E |
| (A + B + C) | E | (A + B + C + E) | D |
| D | E | (D + E) | I3 |
| (D + E) | (A + B) | (A + B + D + E) | C |
| (D + E) | C | (C + D + E) | I4 |
| (C + D + E) | A | (A + C + D + E) | B |
| (C + D + E) | B | (B + C + D + E) | A |
| 4. 6 Points 22: A, B, C, D, E and F | | | |
| A | B | (A + B) | I1 |
| (A + B) | C | (A + B + C) | I2 |
| (A + B + C) | D | (A + B + C + D) | I3 |
| (A + B + C + D) | E | (A + B + C + D + E) | F |
| (A + B + C + D) | F | (A + B + C + D + F) | E |
| E | F | (E + F) | I4 |
| (A + B + C) | (E + F) | (A + B + C + E + F) | D |
| D | (E + F) | (D + E + F) | I5 |
| (A + B) | (D + E + F) | (A + B + D + E + F) | C |
| C | (D + E + F) | (C + D + E + F) | I6 |
| (C + D + E + F) | A | (A + C + E + F) | B |
| (C + D + E + F) | B | (B + C + D + E + F) | A |

It is apparent to those of ordinary skill in the art that other methods or procedures for generating conference samples may be readily implemented in the above described system. Further, and as described below, the basic direction and control of TSI 10 and VCS 26 are provided from a central processing or control unit. Different conference procedures may thereby be more readily implemented or changed and it is possible to store a plurality of procedures in the control processor, thereby allowing the dynamic selection of the most effective procedure at a given time or state of operation. It is further possible to provide an adaptive conference procedure which monitors the current operating states of TSI 10 and VCS 26 and adapts to current operating conditions.

Having described the structure and operation of a Time Slot Interchange 10 and a Voice Conferencing System 26 individually, an exhange incorporating both a TSI 10 and a VCS 26 and operating under general direction and control of a data processing system, for example, a computer, will be described next below.

C. Exchange Incorporating TSI 10 and VCS 26 (FIG. 3)

Figure 3:
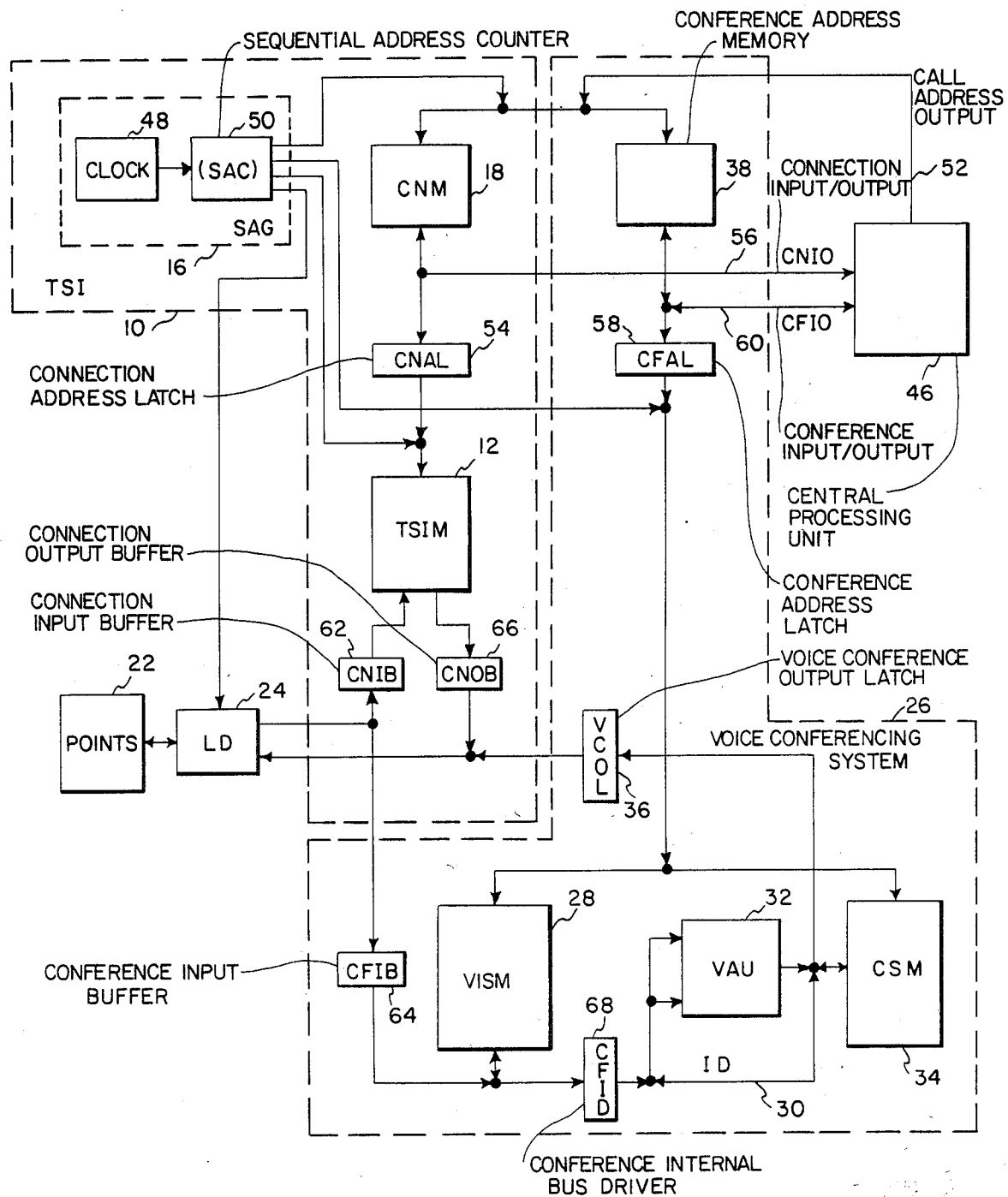
FIG. 3 is a block diagram of an exchange system incorporating a time slot interchange and a voice conferencing system; and, FIG. 4 is a block diagram of a network including a local network exchange switch and a plurality of remote network exchange switches.

Referring to FIG. 3, a block diagram of an Exchange 44 incorporating both Time Slot Interchange (TSI) 10 and Voice Conferencing System (VCS) 26 is shown. TSI 10 and VCS 26 are indicated therein, as are previously described elements of TSI 10 and VCS 26, for example, TSIM 12 and LDs 24 and VSIM 28, VAU 32 and CSM 34. Also indicated are connections from a Central Processing Unit (CPU) 46 which provides inputs for directing and controlling operations of TSI 10 and VCS 26.

Referring first to the addressing mechanisms of TSI 10 and VCS 26, SAG 16 is shown as comprised of a Clock 48 driving a Sequential Address Counter (SAC) 50, which in turn provides sequential address outputs to TSI 10 and VCS 26 as described further below. SAC 50 also provides outputs First Period/Second Period indicating whether TSI 10 is presently operating in the first or second period of a given sub-cycle.

A first SAC 50 sequential address output is provided to the address inputs of CNM 18 and CFM 38 to select, respectively, the corresponding connection or conference addresses for each sub-cycle and corresponding Point 22 serviced in TSI 10's operating cycle, as previously described.

As indicated in FIG. 3, and described further below, the address inputs of CNM 18 and CFM 38 are also connected in parallel from Call Address Output (CALLAD) 52 of CPU 46. CALLAD 52 is used by CPU 46 in writing connection and conference address information, that is, connection and conference addresses, into CNM 18 and CFM 38.

A second SAC 50 sequential address output is provided to the address input of TSIM 12 for sequential write addressing of TSIM 12 as described above. The address input of TSIM 12 is also connected in parallel from the output of Connection Address Latch (CNAL) 54, which in turn is connected from the bidirectional data input/output of CNM 18. The path from the data output of CNM 18 and through CNAL 54 to the address input of TSIM 12 is the path by which CNM 18 provides read addresses to TSIM 12 as previously described.

The bidirectional data input/output of CNM 18 is further shown as being connected from the bidirectional Connection Input/Output (CNIO) 56 of CPU 46. CNIO 56 is used by CPU to write connection address information, that is, connection addresses, into CNM 18 under control of Call Addresses concurrently provided to CNM 18's address input from CALLAD 52. CNIO 56 and CALLAD 52 may also be used by CPU 46 to read connection information from CNM 18.

A third SAC 50 sequential address output is provided to LDs 24 and, as previously described, is used to select and connect the data inputs and outputs of Points 22 to the data inputs and outputs of TSI 10 and VCS 26 during the appropiate corresponding sub-cycles.

Finally, a fourth SAC 50 sequential address output is provided to the address inputs of VSIM 28 and CSM 34. This output provides write and read addresses to, respectively, VSIM 28 and CSM 34 in synchronization with the selection of Points 22 to respectively write individual samples to or read conference samples from VCS 26 as previously described.

As indicated in FIG. 3, the address inputs of VSIM 28 and CSM 34 are also connected in parallel from the output of Conference Address Latch (CFAL) 58, which in turn is connected from the bidirectional data input/output of CFM 38. This path from the data output of CFM 38 is used to provide write and read addresses from CFM 38 to VSIM 28 and CSM 34 as previously described.

The bidirectional data input/output of CFM 38 is further shown as being connected from the bidirectional Conference Input/Output (CFIO) 60 of CPU 46. CFIO 60 is used by CPU to write conference address information, that is, conference addresses, into CFM 38 under control of Call Addresses concurrently provided to CFM 38's address input from CALLAD 52. CFIO 60 and CALLAD 52 may also be used by CPU 46 to read conference information from CFM 38.

The First Period/Second Period outputs of SAC 50 will not be described in detail in view of the above detailed description of TSI 10's and VCS 26's addressing mechanisms. It is apparent to those of ordinary skill in the art that the First Period/Second Period outputs of SAC 50 are provided to the elements of TSI 10 and VCS 26 as required to enable the operations of the elements thereof as required during the appropiate periods of the split sub-cycles as described previously.

Referring finally to TSIM 12 and VSIM 28, Connection Input Buffer (CNIB) 62 and Conference Input Buffer (CFIB) 64 are connected from the data input bus from LDs 24 and respectively to the inputs of TSIM 12 and VSIM 28 to latch and hold input data samples. TSIM 12 is provided with Connection Output Buffer (CNOB) 66 connected from the output of TSIM 12 to TSI 10's data output bus to LDs 24 and VSIM 28 with Conference Internal Bus Driver (CFID) 68 connected from the output of VSIM 28 to ID bus 30.

Having described in detail an Exchange 44 incorporating the time slot interchange and voice conferencing system of the present invention, a network and network exchange switch providing non-blocking communication between Points 22 connected from a network exchange switches will be described next below.

D. Network Exchange Switch (FIG. 4)

As previously described, an exchange switch, that is, a Time Slot Interchange (TSI 10), may be expanded by the addition of a network interchange to form a network exchange switch. Two or more network exchange switches may then be connected in a network providing non-blocking communication between all Points 22 connected from the network.

Figure 4:
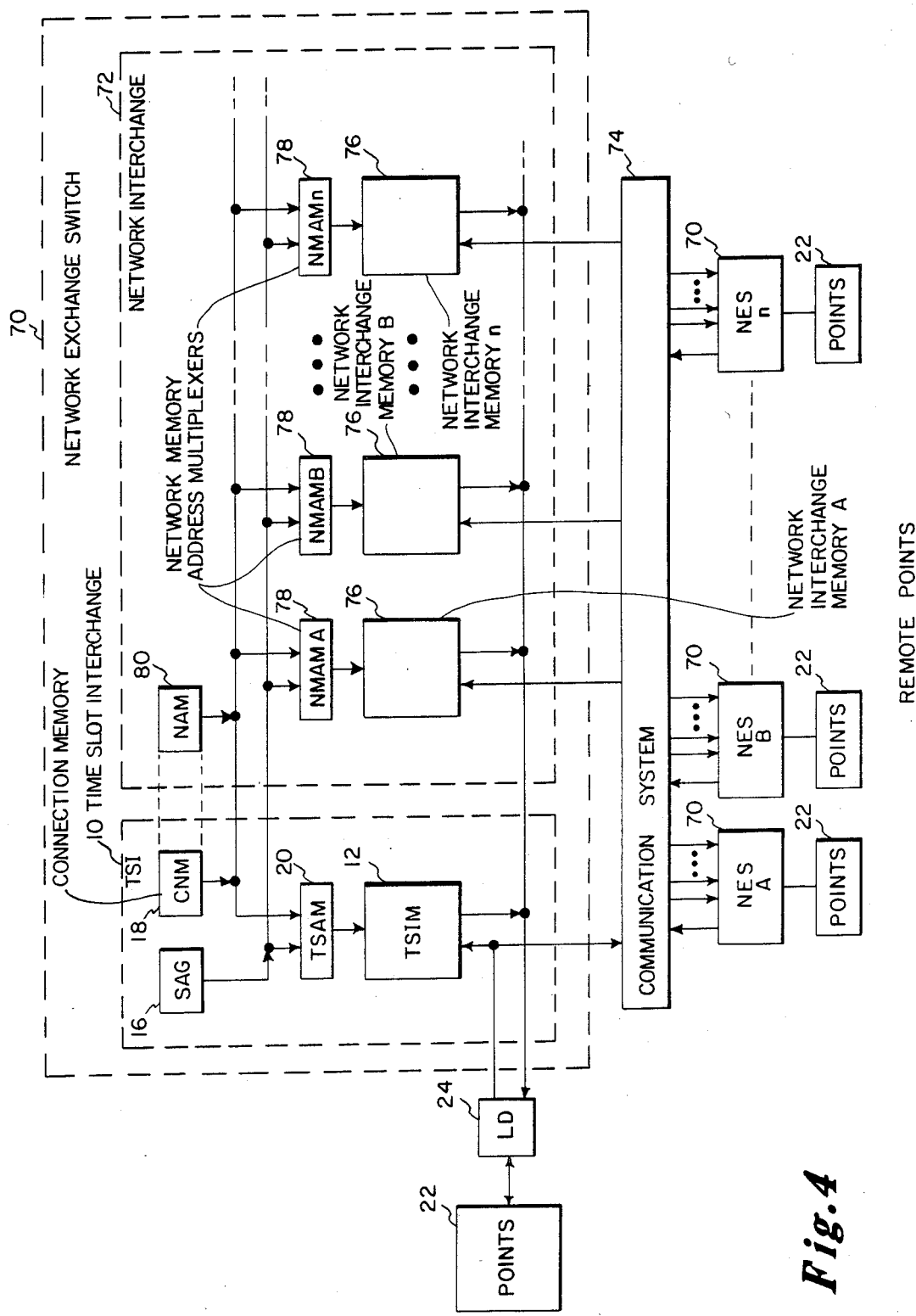

Referring to FIG. 4, a block diagram of a network including a 'local' Network Exchange Switch (NES) 70 connected in a network including a plurality of 'remote' NESs 70 and a Communications System (CS) 74 shown. The 'local' NES 70 is shown at a detailed block diagram level as including a Time Slot Interchange (TSI) 10 and a Network Interchange (NI) 72. During the following description, the NES 70 shown in FIG. 4 will be referred to, as above, as the 'local' NES 70 from which 'local' Points 22 are connected while the other NESs 70 in the network and the Points 22 connected from them will be referred to as 'remote' NESs 70 and 'remote' Points 22. It will be understood that "remote" and "local" do not necessarily imply separation of NESs by physical distance, for example, a 'local' NES 70 and a 'remote' NES 70 may be physically adjacent. 'Local' and 'remote' are used for clarity of presentation in the following description to aid in distinguishing among related, similar operations occurring concurrently in separate, interconnected NESs 70 of the network.

The following will first describe the overall operation of the NESs 70 of the network shown in FIG. 4. The operation of the TSI 10 and NI 72 comprising an NES 70 will then be described in detail.

As described above, an exchange switch (TSI 10) may be expanded by the addition of a network interchange (NI 72) to enable the interconnection of a plurality of Network Exchange Switches (NESs 70) in a network providing non-blocking communication between points connected therefrom. Each NES 70 switch in the network includes an NI 72, with each NI 72 including one or more network memories wherein each network memory corresponds to one of the other NESs 70 in the network. Each such network memory includes a single storage location for and associated with each point connected from the corresponding other NES 70 in the network and is similar in structure and operation to an interchange memory (TSIM 12) of a TSI 10.

As information from the Points 22 connected from a particular NES 70 is written into that NES 70's interchange memory, the information is concurrently transmitted to and written into the corresponding storage locations in the corresponding network memories of the NIs 72 of the other NESs 70 in the network. Each NES 70 will thereby contain, in it's local network memories, copies of the information currently stored in the interchange memories of all other NESs 70.

A Point 22 connected from a local NES 70 and communicating with a remote Point 22 connected from a remote NES 70 will thereby read information transmitted by the remote Point 22 from the remote Point 22's corresponding storage location in the local NES 70's network memory corresponding to the remote NES 70. Similarly, the remote Point 22 will read information transmitted by the local Point 22 from the storage location in the remote NES 70's own network interchange memories corresponding to the local NES 70.

As described further below, storage locations in the network interchange memories of an NES 70 are read and written under direction of node addresses provided from an extension to the TSI 10's connection memory (CNM 18), the CNM 18 being expanded to include node address information. The node addresses stored in a particular local CNM 18 extension identify, for each Point 22 connected from each remote NES 70 in the network, the particular local network memory corresponding to that remote NES 70 and the storage location in the local network memory corresponding to that remote Point 22.

Although NI 72 has been described above as an extension to TSI 10, the structure and operation of NES 70 may be described as a unified structure, wherein TSIM 12 is, in fact, another NIM 76 for storing 'copies' of the information samples transmitted by the Points 22 connected from the 'local' NES 70. In this case, NES 70 is described as including a plurality of interchange memories wherein each interchange memory corresponds to an NES 70 in the network, whether 'local' or 'remote', and stores a copy of the information samples transmitted by the Points 22 connected from the corresponding NESs 70. CNM 18 and NAM 80 may then be considered as unified node address mechanism, wherein the node addresses provided therefrom identify the memory corresponding to the NES 70 with which a 'local' Point 22 is communicating and the storage location within the interchange memory corresponding to the particular Point 22 connected from that NES 70 with which the 'local' Point 22 is communicating. During the read period of a sub-cycle, therefore, a 'local' Point 22 receives an information sample from the interchange memory and storage location therein corresponding to the Point 22 with with it is communicating, without distinction as to whether the other Point 22 is 'local' or 'remote'.

Having described the overall structure and operation of the NESs 70 of the network shown in FIG. 4, the structure and operation of the TSI 10 and NI 72 comprising a NES 70 will be described in further detail next below. Referring to the TSI 10 of the local NES 70 in FIG. 4, as indicated therein and as previously described TSI 10 includes an addressing mechanism comprised of SAG 16, CNM 18 and TSAM 20 providing point (write) and connection (read) addresses to TSIM 12. Also as previously described, the input and output busses of TSIM 12 are connected from and to Points 22 through LDs 24.

Again as previously described, TSI 10 operates on the basis of a sequence of split sub-cycles. During the first half of a given sub-cycle, an information sample from the Point 22 selected by a corresponding point address is written into the TSIM 12 location corresponding to that point address. During the second half of the sub-cycle, an information sample from a Point 22 with which the first Point 22 is communicating is read to the first Point 22 from the TSIM 12 location corresponding to the second Point 22 and selected by the corresponding connection address. This operation is continued for successive sub-cycles, until all Points 22 are connected from TSI 10 have, each during its' corresponding sub-cycle, transmitted and received an information sample to and from the Point 22 with which it is communicating, and is then repeated.

TSI 10 of the local NES 70 shown in FIG. 4 is shown as having a further connection from TSIM 12's input bus to the transmit input of CS 74, for example, a set of high speed serial data buses. Information samples from the local Points 22 connected from the local NES 70 are transmitted through this connection and through CS 74 to the other NESs 70 in the network at the same time as they are selected and written into the TSIM 12 of the local NES 70. All other NESs 70 in the network, that is, all remote NESs 70, will thereby be provided with 'copies' of the information samples written into the TSIM 12 of the local NES 70 at the same time that the samples are written into the TSIM 12 of the local NES 70 from the local Points 22.

Each NES 70 in the network has such an output connection from it's TSIM 12 input bus to CS 74 and has an input through CS 74, as described below, from the output of each other NES 70 in the network. Each NES 70 in the network will thereby provide 'copies' of 'local' information samples to all other NESs 70 in the network, and each NES 70 in the network will receive 'copies' of 'local' information samples from all other NESs 70 in the network.

Referring now to Network Interchange (NI) 72 of the 'local' NES 70 shown in FIG. 4, NI 72 is shown as including a plurality of Network Interchange Memories (NIMs) 76, each being provided with addresses through an accompanying Network Memory Address Multiplexer (NMAM) 78. NI 72 contains a NIM 76 for each other NES 70 in the network and each NIM 76 corresponds to and is associated with a particular other NES 70 in the network; that is, NIM 76-A corresponds to 'remote' NES 70-A, NIM 76-B to 'remote' NES 70-B, and so on with NIM 76-n corresponding to 'remote' NES 70-n.

Each NIM 76 and NMAM 78 in NI 72 is similar in structure and operation to, repectively, TSIM 12 and TSAM 20 of TSI 10 and operate in parallel with TSIM 12 and TSAM 20, with the difference that the information samples stored therein are 'copies' of those stored in TSIMs 12 of the 'remote' NESs 70. More particularly, the storage locations in a given NIM 76 correspond to and are parallel to the storage locations in both the 'local' TSIM 12 and the TSIM 12 of the NES 70 corresponding to the that NIM 76.

As shown in FIG. 4, the input data bus of each NIM 76 is connected from an output of CS 74 and, through CS 74, to the output from the TSI 10 input bus of the corresponding 'remote' NES 70. A 'copy' of the information samples currently written into the TSIM 12 of a particular 'remote' NES 70 is thereby concurrently written into and resides in the corresponding NIM 76 of NI 72.

Each NI 72 of each NES 70 of the network includes a NIM 76 for and corresponding to each other NES 70 in the network, so that each NES 70 will contain, in its' corresponding NIMs 76, 'copies' of the information samples residing in the TSIMs 12 of all other NESs 70 in the network.

As shown in FIG. 4 the output data bus of each NIM 76 of NI 72 is connected, in parallel with the output data busses of all other NIMs 76 of the NI 72, to the output data bus of TSIM 12 of TSI 10. A Point 22 connected from a 'local' NES 70 may thereby read information samples either from the TSI 10 of the 'local' NES 70, that is, from another 'local' Point 22, or from an NIM 76 of the 'local' NES 70, that is, from a 'remote' Point 22 connected from a 'remote' NES 70.

Any Point 22 connected from any NES 70 in the network may thereby be directly provided, from the 'copies' residing in the NIMs 76 of its' own NES 70, with information samples transmitted by any other Point 22 connected from the network. Any Point 22 connected from the network thereby becomes effectively 'local' with respect to any other Point 22 in the network.

As previously described, the writing of information samples into the TSI 10 or the NIMs 76 of a NES 70 may be controlled by point addresses provided from the SAG 16 of the NES 70. In those systems, however, where propagation delay times between NESs 70 becomes of significance with respect to the sub-cycle period, the writing of information into NIMs 76 may be controlled by separately from the writing of information into TSIM 12. For example, a separate SAG 16 may be provided for NI 72 or write addresses may be provided from the NESs 70 providing the information to be written into the NIMs 76. In either case, the transmitting NESs 70 will provide synchronizing information, for example, in the form of synchronizing characters, which may be used to synchronize the writing of information into NIMs 76 with the writing and reading of information into and from TSIM 12. The most important factor, for good quality voice communication, is that a new sample be written into each NIM 76 location involved in a NES 70 to NES 70 communication during each exchange switch operating cycle. The writing of information into NIM 76 may, however, occur at any time during a cycle and in any order and may, for example, be offset from the TSIM 12 cycle by one or more operating cycles.

The reading of information samples from TSI 10 is controlled by connection addresses provided from CNM 18 of the NES 70. The reading of information samples from the NES 70's NIMs 76, however, is controlled by connection addresses provided from the CNM 18 and corresponding node addresses provided from an extension to CNM 18 residing in NI 72.

As indicated in FIG. 4, NIMs 76 receive write and read address inputs from, respectively, SAG 16 and CNM 18 of TSI 10 and from from Node Address Memory (NAM) 80. NAM 80 is a parallel extension of CNM 18 and provides, for those 'local' Points 22 communicating with 'remote' Points 22, node address extensions to the connection addresses provided by CNM 18. A node address extension corresponding to a connection address stored in CNM 18 identifies, for a particular corresponding Point 22 which is communicating with a remote Point 22, the NIM 76 associated with the NES 70 of the remote Point 22. That is, the node address information provided by NAM 80 and corresponding to a particular connection address identifies the NIM 76 associated with the NES 70 of a remote Point 22 while the connection address identifies the storage location within that NIM 76 corresponding to that particular remote Point 22.

The TSI 10 and NI 72 of each NES 70 operate, as previously described, on the basis of a sequence of split sub-cycles. During the first half of a given sub-cycle, a Point 22 connected from a NES 70 is selected by a corresponding point address provided by the SAG 16 of the NES 70 and an information sample from the Point 22 is written into the NES 70's TSIM 12 location corresponding to that point address. The information sample is concurrently transmitted through CS 74 to the other NESs 70 of the network and is written into the corresponding NIMs 76 of the other NESs 70 of the network under control of point addresses provided by the SAGs 16 of the other NESs 70.

During the second half of the sub-cycle, an information sample from a Point 22 with which the first Point 22 is communicating is read to the first Point 22. If the second Point 22 is 'local' to the first Point 22, that is, is connected from the same NES 70, the information sample is read from the TSIM 12 location selected by the corresponding connection address provided from the NEs 70's CNM 18. If the second Point 22 is 'remote' from the first Point 22, that is, is connected from a different NES 70, the information sample is read from the 'copy' thereof residing in one of the NES 70's NIMs 76. The NIM 76 corresponding to the 'remote' NES 70 from which the second Point 22 is connected is identified by the node address provided from NAM 80 while the storage location within the selected NIM 76 corresponding to the 'remote' Point 22 is determined by the connection address provided from CNM 18.

Again, the combination of TSI 10 and NI 72 may be regarded as a unified structure with TSIM 12 comprising, in fact, another NIM 76 for storing copies of information samples transmitted by the 'local' Points 22 and CNM 18 and NAM 80 comprising a unified node addressing mechanism. In this case, NES 70 is described as including a plurality of interchange memories wherein each interchange memory corresponds to an NES 70 in the network, whether 'local' or 'remote', and stores a copy of the information samples transmitted by the Points 22 connected from the corresponding NESs 70. The node addresses provided from CNM 18 and NAM 80 then identify the interchange memory corresponding to the NES 70 with which a 'local' Point 22 is communicating and the storage location within the memory corresponding to the particular Point 22 connected from that NES 70 with which the 'local' Point 22 is communicating.

It will be understood by those of ordinary skill in the art that the NIs 72 described above may be incorporated into the Exchanges 44 previously described to provide non-blocking communications between a network of Exchanges 44. It will also be understood that the operation of the NESs 70 of a network as just described may be controlled through a central processor, such as CPU 46 described previously with reference to Exchange 44; in this embodiment, CPU 46 will provide both connection addresses to the CNMs 18 and node addresses to the NAMs 80 of the NESs 70 of the network.

Having described in detail a network and Network Exchange Switch 72 incorporating the time slot interchange and network interchange of the present invention, further embodiments or expansions of the present invention will be decribed next below.

E. Further and Expanded Embodiments

As previously described, the capacity of both TSI 10 and VCS 26 may be readily increased. For example, the number of sub-cycles in TSI 10's and VCS 26's operating cycles may be increased to acommodate further Points 22 and the sample rate of Exchange 44 may be similarly increased above the 8 kHz example presented herein.

Further, TSIM 12, VSIM 28 and CSM 34 and their associated data busses may, for example for voice communications, be 8 bits wide. A part or all of TSI 10 may be provided, as described above, with the capability of data communications. In this case, TSIM 12 or the portions thereof to be provided with data communications capability and TSI 10's input and output busses may be increased in width to that required for the data to be transmitted, for example, 12, 16, 24 or 32 bits.

Points 22 may, as described above, include telephone handsets, "data phones", personal computers, computers and data processing systems and other communications systems.

The connection of other communications systems through or as a Point 22 allows two or more Exchanges 44 to be directly interconnected to construct a communications network. The number of input/output lines used for internode communications and the number of lines provided for connection to points, however, depends upon whether internode communications are to be blocking or non-blocking; as previously described, each non-blocking communications path requires a corresponding path in space or time. For example, the Exchange 44 presented above has a capacity of servicing 1024 points with non-blocking communications. If non-blocking internodal communications were desired between two nodes or Exchanges 44, one half, or 512, of the input/output lines of each of the two Exchanges 44 could be connected to each other as an internode bus, leaving 512 input/output lines for connection to points. This system would then provide a 512 point, non-blocking, two node network. Fewer input/output lines would be required for the internode bus if blocking internode communication were acceptable, and the number of points connected to the Exchanges 44 would be correspondingly increased.

In an alternate embodiment, two or more Exchanges 44 may be connected indirectly to provide non-blocking internode communications. In this embodiment, the Exchanges 44 are provided with separate, high speed data links dedicated to internode communications. The portion of a link residing at an Exchange 44 would be connected to TSI 10's input and output busses in the same manner as a Point 22 but would operate at a higher speed than a Point 22 as it would provide and receive data and voice samples for the Points 22 located at another Exchange 44. The data links would perform direct data transfers between TSIMs 12 of the Exchanges 44 so interconnected, that is, direct memory to memory transfers.

TSI 10 may also utilized for a form of 'broadcast' transmission, that is, wherein voice or data from one Point 22 is concurrently transmitted to two or more other Points 22. In this case, the receiving Points 22 will, rather than reading information from different Slots 14 corresponding to different transmitting Points 22, read information from the single Slot 14 corresponding to the transmitting, or 'broadcasting', Point 22.

Finally, voice data transmitted through TSI 10 has been described above as digitized, that is, as having been sampled and converted to a sequence of digital data samples which may be reconstructed after reception to provide an analog voice output signal to a user. In the presently preferred embodiment, voice is digitized according to the generally accepted u-Law procedure, although other sampling methods may be used in other embodiments. Similarly, a variety of procedures or methods may be used to generate conference samples in VCS 26, including adaptive procedures to adapt the operation of Exchange 44 to current operating conditions.

The invention described herein may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A time slot interchange for communicating information samples between points, comprising:
   interchange memory means including an associated single storage location for each point,
   means for providing point addresses, each point address corresponding to a point and an associated storage location, and
   means responsive to each of the point addresses for providing corresponding connection addresses, each connection address corresponding to a storage location associated with a point with which the point corresponding to the point address is communicating,
   the interchange memory means responsive to each point address for writing a sample from the corresponding point into the associated storage location and to each connection address for reading a sample from the associated storage location to the point associated with the corresponding point address.

2. The time slot interchange of claim 1, further comprising:
   clock means defining successive sub-cycles, each sub-cycle having a write period and a read period,
   the point address means responsive to operation of the clock means to provide a point address during each sub-cycle,
   the interchange memory means responsive to operation of the clock means
      during the write period of each sub-cycle to write a sample from the point corresponding to the point address and into the associated storage location, and
      during the read period of each sub-cycle to read a sample from the storage location corresponding to the connection address and to the point corresponding to the point address.

3. The time slot interchange of claim 1, further comprising:
   central processor means for providing connection addresses to the connection address means.

4. A time slot interchange for communicating information samples between points, comprising:
   interchange memory means including an associated single storage location for each point,
   clock means defining successive sub-cycles, each sub-cycle having a write period and a read period,
   means responive to operation of the clock means for providing a point address during each sub-cycle, each point address corresponding to a point and an associated storage location, and
   means responsive to each of the point addresses for providing a corresponding connection address during each sub-cycle, each connection address corresponding to a storage location associated with a point with which the point corresponding to the point address is communicating,
the interchange memory means responsive to each point and connection address and to operation of the clock means
during the write period of each sub-cycle to write a sample from the point corresponding to the point address and into the associated storage location, and
during the read period of each sub-cycle to read a sample from the storage location corresponding to the connection address and to the point corresponding to the point address.

5. The time slot interchange of claim 4, further comprising:
central processor means for providing connection addresses to the connection address means.

6. Voice conferencing means for communicating voice information samples among a plurality of points, comprising:
means for providing point addresses, each point address corresponding to a point in a conference connection,
means responsive to each point address for providing conference addresses, each conference address corresponding to a point in a conference connection with the point corresponding to the point address,
sample memory means responsive to each point address for storing individual samples from the corresponding points, and
conference processor means connected from the sample memory means and responsive to each point address and corresponding conference addresses for providing corresponding conference samples to the points corresponding to the point addresses,
each conference sample comprising a summation of the individual samples from the points corresponding to the conference addresses.

7. The voice conferencing means of claim 6, wherein the conference processor means includes:
sum memory means for storing and providing intermediate conference sums and the final conference sums, and
arithmetic means connected from the sample and sum memory means for receiving the individual samples and intermediate conference sums and providing the intermediate and final conference sums.

8. The voice conference means of claim 6, further comprising:
clock means defining successive sub-cycles, each sub-cycle having a write period and a read period,
the point address means responsive to operation of the clock means to provide point addresses during corresponding sub-cycles,
the sample memory means and conference processor means responsive to operation of the clock means in each sub-cycle corresponding to a point address,
during the write period, to receive an individual sample from or to provide a conference sample to the corresponding point, and
during the read period, to perform operations to generate a conference sum for the corresponding point.

9. The voice conferencing means of claim 6, further comprising:
central processor means for providing conference addresses to the conference address means.

10. Voice conferencing means for communicating voice information samples among a plurality of points, comprising:
means for providing point addresses, each point address corresponding to a point in a conference connection,
means responsive to each point address for providing conference addresses, each conference address corresponding to a point in a conference connection with the point corresponding to the point address,
sample memory means responsive to each point address for storing individual samples from the corresponding points,
conference processor means connected from the sample memory means and responsive to each point address and corresponding conference addresses for providing corresponding conference samples to the points corresponding to the point addresses,
each conference sample comprising a summation of the individual samples from the points corresponding to the conference addresses, and
clock means defining successive sub-cycles, each sub-cycle having a write period and a read period,
the point address means responsive to operation of the clock means to provide point addresses during corresponding sub-cycles,
the sample memory means and conference processor means responsive to operation of the clock means in each sub-cycle corresponding to a point address,
during the write period, to receive an individual sample from or to provide a conference sample to the corresponding point, and
during the read period, to perform operations to generate a conference sum for the corresponding point.

11. The voice conferencing means of claim 10, further comprising:
central processor means for providing conference addresses to the conference address means.

12. Exchange switch means, comprising:
time slot interchange means for communicating information samples between points, including
interchange memory means including an associated single storage location for each point,
means for providing point addresses, each point address corresponding to a point and an associated storage location, and
means responsive to each of the point addresses for providing corresponding connection addresses, each connection address corresponding to a storage location associated with a point with which the point corresponding to the point address is communicating,
the interchange memory means responsive to each point address for writing a sample from the corresponding point and into the associated storage location and to each connection address for reading a sample from the associated storage location and to the point associated with the corresponding point address, and
voice conferencing means for communicating voice information samples among a plurality of points, including means responsive to each point address for providing conference addresses, each conference address corresponding to a point in a conference connection with the point corresponding to the point address, sample memory means responsive to each point address for storing individual samples from the corresponding points, and conference processor means connected from the sample memory means and responsive to each point address and corresponding conference addresses for providing corresponding conference samples to the points corresponding to the point addresses, each conference sample comprising a summation of the individual samples from the points corresponding to the conference addresses.

13. The exchange switch means of claim 12, further comprising:

clock means defining successive sub-cycles, each sub-cycle having a write period and a read period, the point address means responsive to operation of the clock means to provide a point address during each sub-cycle, the interchange memory means responsive to operation of the clock means during the write period of each sub-cycle to write a sample from the point corresponding to the point address and into the associated storage location, and during the read period of each sub-cycle to read a sample from the storage location corresponding to the connection address and to the point corresponding to the point address, and the sample memory means and conference processor means responsive to operation of the clock means in each sub-cycle corresponding to a point address during the write period to receive an individual sample from or to provide a conference sample to the corresponding point, and during the read period to perform operations to generate a conference sum for the corresponding point.

14. The exchange switch means of claim 12, further comprising:

central processor means for providing connection addresses to the connection address means and conference addresses to the conference address means.

15. Exchange switch means, comprising:

time slot interchange means for communicating information samples between points, including interchange memory means including an associated single storage location for each point, means for providing point addresses, each point address corresponding to a point and an associated storage location, and means responsive to each of the point addresses for providing corresponding connection addresses, each connection address corresponding to a storage location associated with a point with which the point corresponding to the point address is communicating, the interchange memory means responsive to each point address for writing a sample from the corresponding point into the associated storage location and to each connection address for reading a sample from the associated storage location to the point associated with the corresponding point address, and voice conferencing means for communcating voice information samples among a plurality of points, including means responsive to each point address for providing conference addresses, each conference address corresponding to a point in a conference connection with the point corresponding to the point address, sample memory means responsive to each point address for storing individual samples from the corresponding points, and conference processor means connected from the sample memory means and responsive to each point address and corresponding conference addresses for providing corresponding conference samples to the points corresponding to the point addresses, each conference sample comprising a summation of the individual samples from the points corresponding to the conference addresses, and clock means defining successive sub-cycles, each sub-cycle having a write period and a read period, the point address means responsive to operation of the clock means to provide a point address during each sub-cycle, the interchange memory means responsive to operation of the clock means during the write period of each sub-cycle to write a sample from the point corresponding to the point address and into the associated storage location, and during the read period of each sub-cycle to read a sample from the storage location corresponding to the connection address and to the point corresponding to the point address, and the sample memory means and conference processor means responsive to operation of the clock means in each sub-cycle corresponding to a point address during the write period to receive an individual sample from or to provide a conference sample to the corresponding point, and during the read period to perform operations to generate a conference sum for the corresponding point.

16. The exchange switch means of claim 15, further comprising:

central processor means for providing connection addresses to the connection address means and conference addresses to the conference address means.

17. In a time slot interchange means, including interchange memory means having an associated single storage location for each point, means for storing point addresses, each point address corresponding to a point and an associated storage location, and means for storing connection addresses, each connection address corresponding to a storage location associated with a point with which a point corresponding to a point address is communicating, a method for communicating information samples between points, comprising the steps of:

providing from the point address means a corresponding point address for each point, responsive to each of the point addresses, providing from the connection address means a corresponding connection address, responsive to each point address, writing a sample from the corresponding point into the associated storage location, and responsive to each corresponding connection address, reading a sample from the associated storage location to the point associated with the corresponding point address.

18. The method of claim 1 wherein the time slot interchange means of claim 1 further includes clock means defining successive sub-cycles, each sub-cycle having a write period and a read period and the method further comprises the steps of:

in response to operation of the clock means, providing a point address from the point address means during each sub-cycle, and in response to operation of the clock means,
writing a sample from the point corresponding to the point address into the associated storage location during the write period of each sub-cycle,
reading a sample from the storage location corresponding to the connection address and to the point corresponding to the point address during the read period of each sub-cycle.

19. In a time slot interchange means, including interchange memory means having an associated single storage location for each pont, means for storing point addresses, each point address corresponding to a point and an associated storage location, means for storing connection addresses, each connection address corresponding to a storage location associated with a point with which a point corresponding to a point address is communicating, and clock means defining successive sub-cycles, each sub-cycle having a write period and a read period, a method for communicating information samples between points, comprising the steps of:

in response to operation of the clock means, providing a corresponding point address from the point address means during each sub-cycle, responsive to each of the point addresses during each sub-cycle, providing from the connection address means a corresponding connection address, in response to operation of the clock means,
and in response to each point address, writing a sample from the point corresponding to the point address into the associated storage location during the write period of each sub-cycle, and
and in response to each corresponding connection address, reading a sample from the storage location corresponding to the connection address to the point corresponding to the point address during the read period of each sub-cycle.

20. In a voice conferencing means including means for storing point addresses, each point address corresponding to a point in a conference connection, means for storing conference addresses, each conference address corresponding to a point in a reference connection with a point corresponding to a point address, sample memory means for storing individual samples from the points, and conference processor means connected from the sample memory means for generating conference samples, a method for communicating voice information samples among a plurality of points, comprising:

providing from the point address means a corresponding point address for each point in a conference connection, responsive to each point address, providing from the conference address means conference addresses of points connected in conference with the point corresponding to the point address, responsive to each point address, storing in the sample memory means an individual sample from the corresponding point, responsive to each point address and corresponding conference addresses, generating corresponding conference samples for the points corresponding to the point addresses, and responsive to each point address, providing the corresponding conference sample to the point corresponding the point address.

21. The method of claim 4 wherein the voice conferencing means further includes clock means defining successive sub-cycles, each sub-cycle having a write period and a read period, and the method further comprises the steps of:

in response to operation of the clock means, providing a corresponding point address from the point address means during each sub-cycle corresponding to a point in a conference connection, responsive to each of the point addresses during each sub-cycle, providing from the conference address means the corresponding conference address, in response to operation of the clock means in each sub-cycle corresponding to a point address of a point in a conference connection,
during the write period,
and responsive to the corresponding point address, storing in the sample memory means an individual sample from the corresponding point, or providing a conference sample to the corresponding point, and
during the read period,
and responsive to the corresponding point address, performing an operation to generate a conference sum for the corresponding point.

22. In a voice conferencing means including means for storing point addresses, each point address corresponding to a point in a conference connection, means for storing conference addresses, each conference address corresponding to a point in a conference connection with a point corresponding to a point address, sample memory means for storing individual samples from the points, conference processor means connected from the sample memory means for generating conference samples, and clock means defining successive sub-cycles, each sub-cycle having a write period and a read period, a method for communicating voice information samples among a plurality of points, comprising:

in response to operation of the clock means, providing a corresponding point address from the point address means during each sub-cycle corresponding to a point in a conference connection, responsive to each of the point addresses, providing from the conference address means conference addresses of points connected in conference with the point corresponding to the point address, in response to operation of the clock means in each sub-cycle corresponding to a point address of a point in a conference connection,
during the write period, and responsive to the corresponding point address, storing in the sample memory means an individual sample from the corresponding point, or providing a conference sample to the corresponding point, and during the read period, and responsive to the corresponding point and conference addresses, performing an operation to generate a conference sum for the corresponding point.

23. In an exchange switch means, including a time slot interchange means and a voice conferencing means, the time slot interchange means including interchange memory means having an associated single storage location for each point, means for storing point addresses, each point address corresponding to a point and an associated storage location, and means for storing connection addresses, each connection address corresponding to a storage location associated with a point with which a point corresponding to a point address is communicating, a method for communicating information samples between points, and the voice conferencing means including means for storing conference addresses, each conference address corresponding to a point in a conference connection with a point corresponding to a point address, sample memory means for storing individual samples from the points, and conference processor means connected from the sample memory means for generating conference samples, the method for communicating information samples between points, comprising the steps of:

providing from the point address means a corresponding point address for each point, responsive to each of the point addresses, providing from the connection address means a corresponding connection address, responsive to each point address, writing a sample from the corresponding point and into the associated storage location, and responsive to each corresponding connection address, reading a sample from the associated storage location and to the point associated with the corresponding point address, and, concurrently, responsive to each point address, providing from the conference address means conference addresses of points connected in conference with the point corresponding to the point address, responsive to each point address, storing in the sample memory means an individual sample from the corresponding point, responsive to each point address and corresponding conference addresses, generating corresponding conference samples for the points corresponding to the point address, and responsive to each point address, providing the corresponding conference sample to the point corresponding to the point address.

24. In an exchange switch means, including a time slot interchange means and a voice conferencing means, the time slot interchange means including interchange memory means having an associated single storage location for each point, means for storing point addresses, each point address corresponding to a point and an associated storage location, and means for storing connection addresses, each connection address corresponding to a storage location associated with a point with which a point corresponding to a point address is communicating, a method for communicating information samples between points, the voice conferencing means including means for storing conference addresses, each conference address corresponding to a point in a conference connection with a point corresponding to a point address, sample memory means for storing individual samples from the points, and conference processor means connected from the sample memory means for generating conference samples, and the exchange including clock means defining successive sub-cycles, each sub-cycle having a write period and a read period, the method for communicating information samples between points, comprising the steps of:

in response to operation of the clock means, providing a corresponding point address from the point address means during each sub-cycle, responsive to each of the point addresses during each sub-cycle, providing from the connection address means a corresponding connection address, in response to operation of the clock means, and in response to each point address, writing a sample from the point corresponding to the point address into the associated storage location during the write period of each sub-cycle, and and in response to each corresponding connection address, reading a sample from the storage location corresponding to the connection address to the point corresponding to the point address during the read period of each sub-cycle, and, concurrently, responsive to each of the point addresses, providing from the conference address means conference addresses of points connected in conference with the point corresponding to the point addressr, in response to operation of the clock means in each sub-cycle corresponding to a point address of a point in a conference connection, during the write period, and responsive to the corresponding point address, storing in the sample memory means an individual sample from the corresponding point, or providing a conference sample to the corresponding point, and during the read period, and responsive to the corresponding point and conference addresses, performing an operation to generate a conference sum for the corresponding point.

25. A network exchange switch for communicating information samples between points connected from a plurality of network exchange switches connected in a network, comprising:

time slot interchange means, including time slot interchange memory means including an associated single storage location for each point connected from the switch, point address means for providing point addresses, each point address corresponding to a point connected from the switch and an associated storage location in the time slot interchange memory means, and connection address means responsive to each of the point addresses for providing corresponding connection addresses, each connection address corresponding to a point with which the point corresponding to the point address is communicating, and network interchange means, including output means for communicating information samples read from corresponding points connected from the switch to the other switches connected in the network, a plurality of network interchange memory means, each network interchange memory means corresponding to another switch in the network and connected from the network interchange output means of the corresponding other switch and including an associated single storage location for each point connected therefrom, and node address means responsive to operation of the point address means for providing node addresses corresponding to the network memory means corresponding to other switches of other points with which a point connected from the network exchange switch is communicating, wherein the time slot interchange memory means is responsive to each point address for writing a sample from the corresponding point and into the associated time slot interchange memory means storage location, the output means is responsive to each point address for transmitting the corresponding information sample to the corresponding network interchange memory means of each other switch connected in the network, the network interchange memory means are responsive to certain of the point addresses for writing information samples transmitted by other points connected from other switches into corresponding storage locations in the corresponding network interchange memory means, and the time slot interchange memory means and network interchange memory means are responsive to the connection and node addresses to provide information samples from corresponding storage locations in the corresponding time slot interchange memory means or network interchange memory means and to the points corresponding to the point addresses.

26. The network exchange switch of claim 25, further comprising:

clock means defining successive sub-cycles, each sub-cycle having a write period and a read period, the point address means responsive to operation of the clock means to provide a point address during each sub-cycle, the time slot interchange memory means, the output means and the network interchange memory means responsive to operation of the clock means during the write period of each sub-cycle to write a sample from the point corresponding to the point address into the associated time slot interchange memory means storage location and to the corresponding network interchange memory means of the other switches, and during the read period of each sub-cycle to read a sample from the time slot interchange memory means or network interchange memory means storage location corresponding to the connection and node addresses to the point corresponding to the point address.

27. The network exchange switch means of claim 25, further comprising:

central processor means for direction the operations of the network exchange switch.

28. A network exchange switch for communicating information samples between points connected from a plurality of network exchange switches connected in a network, comprising:

time slot interchange means, including time slot interchange memory means including an associated single storage location for each point connected from the network exchange switch, point address means for providing point addresses, each point address corresponding to a point connected from the switch and an associated storage location in the time slot interchange memory means, and connection address means responsive to each of the point addresses for providing corresponding connection addresses, each connection address corresponding to a point with which the point corresponding to the point address is communicating, and network interchange means, including output means for communicating information samples read from corresponding points connected from the switch to the other network switches connected in the network, a plurality of network interchange memory means, each network interchange memory means corresponding to another switch in the network and connected from the network interchange output means of the corresponding other switches and including an associated single storage location for each point connected therefrom, and node address means responsive to operation of the point address means for providing node addresses corresponding to the network memory means corresponding to other switches of other points with which a point connected from the switch is communicating, and clock means defining successive sub-cycles, each sub-cycle having a write period and a read period, wherein the point address means is responsive to operation of the clock means to provide a point address during each sub-cycle, the time slot interchange memory means is responsive to operation of the clock means and to each point address during the write period of each sub-cycle for writing a sample from the corresponding point into the associated time slot interchange memory means storage location, the output means is responsive to operation of the clock means and to each point address during the write period of each sub-cycle for transmitting the corresponding information sample to the corresponding network interchange memory means of each other switch connected in the network, the network interchange memory means are responsive to operation of the clock means and to certain of the point addresses during the write period of each sub-cycle for writing information samples transmitted by other points connected from other switches into corresponding storage locations in the corresponding network interchange memory means, and the time slot interchange memory means and network interchange memory means are responsive to operation of the clock means and to the connection and node addresses during the read period of each sub-cycle to provide information samples from corresponding storage locations in the corresponding time slot interchange memory means or network interchange memory means to the point corresponding to the point address.

29. The network exchange switch means of claim 28, further comprising:

central processor means for direction the operations of the network exchange switch.

30. A network exchange switch for communicating information samples between points connected from a plurality of network exchange switches connected in a network, comprising:

output means for communicating information samples read from corresponding points connected from the switch to the other switches connected in the network, a plurality of interchange memory means, each interchange memory means corresponding to a switch in the network and including an associated single storage location for each point connected therefrom, one interchange memory means being connected from the points connected from the switch and the other interchange memory means being connected from the output means of the other switches connected in the network, point address means for providing point addresses, each point address corresponding to a point connected from the switch and an associated storage location in the interchange memory means, and node address means responsive to each of the point addresses for providing corresponding node addresses, each node address corresponding to another point with which the point corresponding to the point address is communicating and to the interchange memory means corresponding to the switch from which the other point is connected and the storage location therein corresponding to the other point, wherein the output means is responsive to each point address for transmitting the corresponding information sample to the corresponding interchange memory means of each other switch connected in the network, the interchange memory means are responsive each point address for writing information samples into the corresponding storage locations in the corresponding interchange memory means, and the interchange memory means are responsive to each node address to provide information samples from corresponding storage locations in the corresponding interchange memory means to the points corresponding to the point addresses.

31. The network exchange switch of claim 30, further comprising:

clock means defining successive sub-cycles, each sub-cycle having a write period and a read period, the point address means responsive to operation of the clock means to provide a point address during each sub-cycle, the interchange memory means and the output means responsive to operation of the clock means during the write period of each sub-cycle to write a sample from the point corresponding to the point address into the corresponding storage locations in the corresponding interchange memory means of the network exchange switches, and during the read period of each sub-cycle to read a sample from the interchange memory means storage location corresponding to the node address to the point corresponding to the point address.

32. The network exchange switch means of claim 30, further comprising:

central processor means for direction the operations of the network exchange switch.

33. A network exchange switch for communicating information samples between points connected from a plurality of network exchange switches connected in a network, comprising:

output means for communicating information samples read from corresponding points connected from the network exchange switch to the other switches connected in the network, a plurality of interchange memory means, each interchange memory means corresponding to a switch in the network and including an associated single storage location for each point connected therefrom, one interchange memory means being connected from the points connected from the switch and the other interchange memory means being connected from the output means of the other switches connected in the network, point address means for providing point addresses, each point address corresponding to a point connected from the switch and an associated storage location in the interchange memory means, node address means responsive to each of the point addresses for providing corresponding node addresses, each node address corresponding to another point with which the point corresponding to the point address is communicating and to the interchange memory means corresponding to the switch from which the other point is connected and the storage location therein corresponding to the other point, and clock means defining successive sub-cycles, each sub-cycle having a write period and a read period, wherein the point address means is responsive to operation of the clock means for providing a point address during each sub-cycle, the output means is responsive to operation of the clock means and to each point address during each write period for transmitting the corresponding information sample to the corresponding interchange memory means of each other network exchange switch connected in the network, the interchange memory means are responsive to operation of the clock means and to each point address during each write period for writing information samples into the corresponding storage locations in the corresponding interchange memory means, and the interchange memory means are responsive to operation of the clock means and to each node address during each read period to provide information samples from corresponding storage locations in the corresponding interchange memory means to the points corresponding to the point addresses.

34. The network exchange switch means of claim 30, further comprising:

central processor means for direction the operations of the network exchange switch.

35. In a network comprised of a plurality of interconnected network exchange switches, each switch having a plurality of points connected therefrom and each switch including time slot interchange means, including time slot interchange memory means including an associated single storage location for each point connected from the switch, point address means for providing point addresses, each point address corresponding to a point connected from the switch and an associated storage location in the time slot interchange memory means, and connection address means for providing connection addresses, each connection address corresponding to a point with which the point corresponding to the point address is communicating, and network interchange means, including output means for communicating information samples read from points connected from the switch to the other switches connected in the network, a plurality of network interchange memory means, each network interchange memory means corresponding to another switch in the network and connected from the network interchange output means of the corresponding other switch and including an associated single storage location for each point connected therefrom, and node address means for providing node addresses corresponding to the network memory means corresponding to other switches of other points with which a point connected from the network exchange switch is communicating, a method for communicating information samples between the points connected from the switches of the network, comprising the steps of:

providing from the point address means a sequence of point addresses, responsive to each point address, writing a sample from the corresponding point into the associated time slot interchange memory means storage location, responsive to each point address, transmitting the corresponding information sample from the output means to the corresponding network interchange memory means of each other switch connected in the network, responsive to certain of the point addresses, writing information samples transmitted by other points connected from other switches into corresponding storage locations in the corresponding network interchange memory means, and responsive to the connection and node addresses, providing information samples from corresponding storage locations in the corresponding time slot interchange memory means or network interchange memory means and to the points corresponding to the point addresses.

36. In a network comprised of a plurality of interconnected network exchange switches, each switch having a plurality of points connected therefrom and each switch including time slot interchange means, including time slot interchange memory means including an associated single storage location for each point connected from the switch, point address means for providing point addresses, each point address corresponding to a point connected from the switch and an associated storage location in the time slot interchange memory means, and connection address means for providing connection addresses, each connection address corresponding to a point with which the point corresponding to the point address is communicating, network interchange means, including output means for communicating information samples read from points connected from the switch to the other switches connected in the network, a plurality of network interchange memory means, each network interchange memory means corresponding to another switch in the network and connected from the network interchange output means of the corresponding other switch and including an associated single storage location for each point connected therefrom, and node address means for providing node addresses corresponding to the network memory means corresponding to other switches of other points with which a point connected from the network exchange switch is communicating, and clock means defining successive sub-cycles, each sub-cycle having a write period and a read period, a method for communicating information samples betweeen the points connected from the switches of the network, comprising the steps of:

responsive to operation of the clock means, providing from the point address means a point address during each sub-cycle, responsive to operation of the clock means and to each point address, writing a sample from the corresponding point and into the associated time slot interchange memory means storage location during each write period, responsive to operation of the clock means and to each point address, transmitting the corresponding information sample from the output means to the corresponding network interchange memory means of each other switch connected in the network during each write period, responsive to operation of the clock means and to certain of the point addresses, writing information samples transmitted by other points connected from other switches into corresponding storage locations in the corresponding network interchange memory means during each write period, and responsive to operation of the clock means and to the connection and node addresses, providing information samples from corresponding storage locations in the corresponding time slot interchange memory means or network interchange memory means and to the points corresponding to the point addresses during each read period.

37. In a network comprised of a plurality of interconnected network exchange switches, each switch having a plurality of points connected therefrom and each switch including output means for communicating information samples read from corresponding points connected from the switch to the other switches connected in the network, a plurality of interchange memory means, each interchange memory means corresponding to a switch in the network and including an associated single storage location for each point connected therefrom, one interchange memory means being connected from the points connected from the switch and the other interchange memory means being connected from the output means of the other switches connected in the network, point address means for providing point addresses, each point address corresponding to a point connected from the switch and an associated storage location in the interchange memory means, and node address means responsive to each of the point addresses for providing corresponding node addresses, each node address corresponding to another point with which the point corresponding to the point address is communicating and to the interchange memory means corresponding to the switch from which the other point is connected and the storage location therein corresponding to the other point, a method for communicating information samples betweeen the points connected from the switches of the network, comprising the steps of:

providing from the point address means a sequence of point addresses, responsive to each point address, transmitting the corresponding information sample from the output means to the corresponding interchange memory means of each other switch connected in the network, responsive each point address, writing information samples into the corresponding storage locations in the corresponding interchange memory means, and responsive to each node address, providing information samples from corresponding storage locations in the corresponding interchange memory means to the points corresponding to the point addresses.

38. In a network comprised of a plurality of interconnected network exchange switches, each switch having a plurality of points connected therefrom and each switch including output means for communicating information samples read from corresponding points connected from the switch to the other switches connected in the network, a plurality of interchange memory means, each interchange memory means corresponding to a switch in the network and including an associated single storage location for each point connected therefrom, one interchange memory means being connected from the points connected from the switch and the other interchange memory means being connected from the output means of the other switches connected in the network, point address means for providing point addresses, each point address corresponding to a point connected from the switch and an associated storage location in the interchange memory means, node address means responsive to each of the point addresses for providing corresponding node addresses, each node address corresponding to another point with which the point corresponding to the point address is communicating and to the interchange memory means corresponding to the switch from which the other point is connected and the storage location therein corresponding to the other point, and clock means defining successive sub-cycles, each sub-cycle having a write period and a read period, a method for communicating information samples between the points connected from the switches of the network, comprising the steps of:

responsive to operation of the clock means, providing from the point address means a point address during each sub-cycle, responsive to operation of the clock means and to each point address, transmitting the corresponding information sample from the output means to the corresponding interchange memory means of each other switch connected in the network during each write period, responsive to operation of the clock means and to each point address, writing information samples into the corresponding storage locations in the corresponding interchange memory means during each write period, and responsive to operation of the clock means and to each node address, providing information samples from corresponding storage locations in the corresponding interchange memory means to the points corresponding to the point addresses during each read period.

* * * * *